(12) United States Patent
Agar et al.

(10) Patent No.: US 8,470,079 B2
(45) Date of Patent: Jun. 25, 2013

(54) SEPARATING $CO_2$ FROM GAS MIXTURES

(75) Inventors: David Agar, Dortmund (DE); Yudy Halim Tan, Dortmund (DE); Zhang Xiaohui, Amsterdam (NL)

(73) Assignee: Universital Dortmund, Dortmund (DE)

( * ) Notice: Subject to any disclaimer, the term of this patent is extended or adjusted under 35 U.S.C. 154(b) by 819 days.

(21) Appl. No.: 12/375,567

(22) PCT Filed: Jul. 31, 2007

(86) PCT No.: PCT/EP2007/057907
§ 371 (c)(1),
(2), (4) Date: Jan. 28, 2010

(87) PCT Pub. No.: WO2008/015217
PCT Pub. Date: Feb. 7, 2008

(65) Prior Publication Data
US 2010/0288126 A1 Nov. 18, 2010

(30) Foreign Application Priority Data
Aug. 3, 2006 (DE) .......................... 10 2006 036 228

(51) Int. Cl.
*B01D 53/14* (2006.01)
(52) U.S. Cl.
USPC ................... 95/183; 95/193; 95/209; 95/235; 423/228; 423/229
(58) Field of Classification Search
None
See application file for complete search history.

(56) References Cited

U.S. PATENT DOCUMENTS

| 4,251,494 | A  | * | 2/1981 | Say | 423/228 |
| 6,989,046 | B1 | * | 1/2006 | Slim et al. | 95/181 |
| 7,074,258 | B2 | * | 7/2006 | Collins et al. | 95/193 |
| 7,541,011 | B2 | * | 6/2009 | Hu | 423/220 |
| 8,206,489 | B2 | * | 6/2012 | Cadours et al. | 95/179 |
| 2004/0139855 | A1 | | 7/2004 | Collins et al. | |
| 2007/0286783 | A1 | * | 12/2007 | Carrette et al. | 423/228 |

FOREIGN PATENT DOCUMENTS

| FR | 2 036 167 | 12/1970 |
| GB | 1 353 248 | 5/1974 |
| WO | WO 2007/001190 | 1/2007 |
| WO | WO 2007/104856 | 9/2007 |

OTHER PUBLICATIONS

Wikipedia page for Monoethanolamine from Oct. 16, 2012.*
Wikipedia page for Diethanolamine from Oct. 16, 2012.*
Wikipedia page for Triethanolamine from Oct. 17, 2012.*
Sigma Aldrich page for Diethanolamine from Oct. 16, 2012 and Triethanolamine from Oct. 17, 2012.*

* cited by examiner

*Primary Examiner* — Duane Smith
*Assistant Examiner* — Pankti Patel
(74) *Attorney, Agent, or Firm* — Occhiuti Rohlicek & Tsao LLP

(57) ABSTRACT

The present invention relates to a process for separating off $CO_2$ from a gas stream, wherein in a second step the $CO_2$ is removed from the $CO_2$-absorbing agent by means of phase separation.

18 Claims, 1 Drawing Sheet

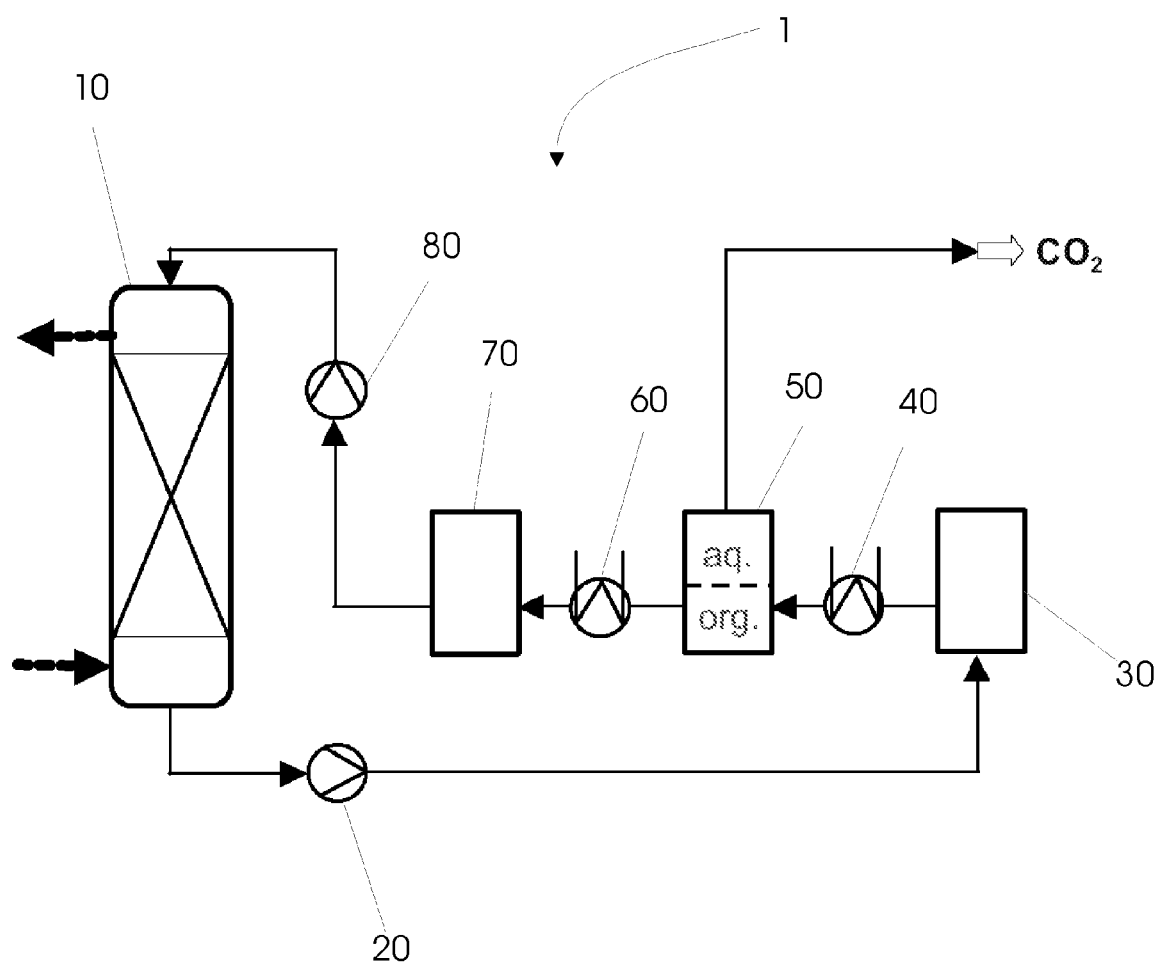

SEPARATING $CO_2$ FROM GAS MIXTURES

CROSS-REFERENCE TO RELATED APPLICATIONS

This application is the National Stage of International Application No. PCT/EP2007/057907, filed on Jul. 31, 2007, which claims the priority of German Application No. 10 2006 036 228.4, filed on Aug. 3, 2006. The contents of both applications are hereby incorporated by reference in their entirety.

The present invention relates to a process for removing $CO_2$ from gas mixtures, and also to a corresponding device therefor.

The removal of $CO_2$ from gas mixtures, for instance the exhaust gas of power stations, is known, inter alia, from DE 10 2004 011428 A1, and also the prior art cited therein.

Here, the gas mixture is admixed with a $CO_2$-absorbing component, usually an aqueous amine solution, wherein either carbamic acids or amine carbonates and/or hydro-carbonates form. Subsequently the $CO_2$ is liberated again from these compounds.

However, all of these processes of the prior art require complex, in particular energy-consuming, steps for the final liberation, since liberation of the $CO_2$ from the $CO_2$ absorbent compounds (whether they are ionic or covalent) does not proceed readily. For this, steps such as heating or stripping are proposed in DE 10 2004 011428 A1; however, these steps are complex and thereby markedly reduce the potential of the removal processes.

The object is therefore to find a process for removal of $CO_2$ from gas mixtures, which process permits a simpler and, in particular, less energy-intensive, liberation of the $CO_2$.

Such a process is provided by Claim 1 of the present invention.

Accordingly, a process is proposed for removing $CO_2$ from a gas mixture and/or gas stream, in particular an exhaust gas stream of power stations or synthesis gases, comprising the steps a) contacting the gas mixture and/or the gas stream with at least one $CO_2$-absorbing agent which, if appropriate, can be present in aqueous solution or suspension;

b) at least partial removal of the at least one $CO_2$-absorbing agent and inducing a phase separation into an aqueous phase and also a nonaqueous phase, wherein the at least one $CO_2$-absorbing agent, after the phase separation, resides at least predominantly in the nonaqueous phase; and also c) an at least predominant transfer of the $CO_2$ to the aqueous phase, wherein step c) can proceed in part or completely simultaneously with step b).

It has proved that, by means of such a process, in most of the applications within the present invention, at least one or more of the following advantages can be achieved:

Because the $CO_2$ is essentially separated from the $CO_2$-absorbing agent (or the agents) by means of the phase separation, the final liberation of the $CO_2$ can proceed considerably more easily and more rapidly. For a number of embodiments of the present invention it has proved that a considerable part of the $CO_2$, directly after the transfer to the aqueous phase, escapes directly from this in the gaseous state.

For a great majority of applications within the present invention it has proved that the steps b) and c) can be carried out under moderate temperatures and conditions such as prevail in any case, e.g., in power stations or industrial chemical processes.

Since the phase separation can be initiated by a small temperature change, in some applications within the present invention just the waste heat from power stations can be sufficient for regenerating the solvent. Hitherto, high-grade heat in the form of steam had to be used for $CO_2$ liberation.

Since there is then no vaporization of the entire solvent stream during regeneration, for a great majority of applications within the present invention, lower amounts of heat and/or smaller apparatuses can also be expected for $CO_2$ liberation.

Owing to the lower regeneration temperatures and separation of the aqueous and organic phases, for a great majority of applications within the present invention, reduced corrosion phenomena may be expected.

The expression "at least partial removal of the at least one $CO_2$-absorbing agent" is taken to mean, in particular, that $\geq 50\%$, preferably $\geq 70\%$, of the at least one $CO_2$-absorbing agent (which, if appropriate, can be present as aqueous solution or suspension) is removed after the contacting with the gas mixture and/or gas stream, in particular is transferred to a container separate from the gas mixture and/or gas stream. According to a preferred embodiment of the invention, the entire $CO_2$-absorbing agent (and/or, if appropriate, the aqueous solution or suspension which contains the $CO_2$-absorbing agent) is removed.

After the phase separation in step b), according to the invention, the at least one $CO_2$-absorbing agent, after the phase separation, at least predominantly resides in the non-aqueous phase. "At least predominantly" is taken to mean here in particular $\geq 70\%$, preferably $\geq 80\%$, more preferably $\geq 90\%$, further preferably $\geq 95\%$, and also most preferably $\geq 99\%$; according to a preferred embodiment of the invention, a complete phase separation of the $CO_2$-absorbing agent from the aqueous phase proceeds.

In step c)—which can proceed in part or completely simultaneously with step b)—the $CO_2$ is at least predominantly transferred to the aqueous phase. "At least predominantly" here is taken to mean, in particular $\geq 70\%$, preferably $\geq 80\%$, more preferably $\geq 90\%$, further preferably $\geq 95\%$, and also most preferably $\geq 99\%$; according to a preferred embodiment of the invention, complete transfer of the $CO_2$ to the aqueous phase proceeds. It may be pointed out that in some embodiments of the present invention, the $CO_2$ can escape in the gaseous state directly or even simultaneously with the transfer to the aqueous phase and/or the separation from the $CO_2$-absorbing agent—which proceeds via the phase separation.

According to a preferred embodiment of the invention, the phase separation in step b) is induced by changing temperature. For many applications within the present invention this has proved to be a passable and practicable way for carrying out the present invention.

According to a preferred embodiment of the invention, the phase separation in step b) is induced by changing the temperature by $\geq 10°$ C. Here, "changing", depending on the specific application, can mean not only a reduction but also an increase of the temperature. Preferably, the phase separation in step b) proceeds via elevation of the temperature by $\geq 10°$ C.

According to a further preferred embodiment of the invention, the phase separation in step b) is induced by changing the temperature by $\geq 20°$ C., more preferably $\geq 25°$ C.

According to a preferred embodiment of the invention, the phase separation in step b) is induced at a temperature of $\geq 60°$ C. to $\leq 100°$ C. This has proved to be advantageous, in particular in processes which run in the power station sector, since then the waste heat of the power station can be utilized for inducing the phase separation. Preferably, the phase separation in step b) is induced at a temperature of $\geq 65°$ C. to $\leq 80°$ C.

According to a preferred embodiment of the invention, the at least one $CO_2$-absorbing agent comprises an amine.

"Amine" is taken to mean, in particular, any component of the form $R_1R_2R_3N$, wherein $R_1$, $R_2$ and $R_3$ independently of one another are selected from the group hydrogen, alkyl, long-chain alkyl, alkenyl, alkoxy, alkenyl-O—X, wherein X is selected from the group containing hydrogen and alkyl, long-chain alkyl, alkylpiperidyl, long-chain alkoxy, cycloalkyl, aryl, arylene, halo-alkyl, wherein, in suitable moieties, one or more nonadjacent $CH_2$ groups, independently of one another, can be replaced by —O—, —S—, —NH—, —NR°—, —SiR°R°°—, —CO—, —COO—, —OCO—, —OCO—O—, —SO_2—, —S—CO—, —CO—S—, —CY$^1$=CY$^2$ or —C≡C— and more precisely such that O and/or S atoms are not directly bonded to one another, likewise optionally replaced by aryl or heteroaryl preferably containing 1 to 30 carbon atoms (terminal $CH_3$ groups are taken to mean $CH_2$ groups in the sense of $CH_2$—H).

General group definitions: Within the description and the claims, general groups such as, e.g.: alkyl, alkoxy, aryl, etc. are claimed and described. If not described otherwise, the following groups are preferably used within the generally described groups in the context of the present invention:

alkyl: primary, secondary or tertiary linear, iso, secondary, tertiary, branched or polyalkyl moieties of length $C_1$-$C_{12}$, in particular $C_5$-$C_{12}$, $C_1$-$C_{10}$ and/or $C_2$-$C_{10}$ long-chain alkyls: linear and branched $C_5$-$C_{20}$ alkyls, in particular $C_{10}$-$C_{1-5}$ alkenyl: primary, secondary or tertiary linear, iso, secondary, tertiary, branched or polyalkenyl moieties of length $C_5$-$C_{12}$, in particular $C_5$-$C_{12}$, $C_1$-$C_{10}$ and/or $C_2$-$C_{10}$ cycloalkyl: $C_3$-$C_9$-cycloalkyl, in particular $C_4$-$C_8$-cycloalkyl and $C_6$-$C_9$-cycloalkyl alkylpiperidyl: mono-, di- or polyalkyl-substituted piperidyl moieties, wherein the branching can proceed via the nitrogen atom or one of the carbon atoms alkoxy: primary, secondary or tertiary linear, iso, secondary, tertiary, branched or polyalkoxy moieties of length $C_5$-$C_{12}$, in particular $C_5$-$C_{12}$, $C_1$-$C_{10}$ and/or $C_2$-$C_{10}$ long-chain alkoxy: linear and branched $C_5$-$C_{20}$ alkoxy, in particular $C_{10}$-$C_{15}$ aryl: selected from aromatics having a molecular weight below 300 Da arylenes: selected from the group containing: 1,2-phenylene; 1,3-phenylene; 1,4-phenylene; 1,2-naphthalenylene; 1,3-naphthalenylene; 1,4-naphthalenylene; 2,3-naphthalenylene; 1-hydroxy-2,3-phenylene; 1-hydroxy-2,4-phenylene; 1-hydroxy-2,5-phenylene; and 1-hydroxy-2,6-phenylene haloalkyl: selected from the group containing mono-, di-, tri-, poly- and perhalogenated primary, secondary or tertiary linear, iso, secondary, tertiary, branched or polyalkyl moieties of length $C_5$-$C_{12}$ According to a preferred embodiment of the invention the at least one $CO_2$-absorbing agent comprises at least one secondary amine and/or at least one tertiary amine.

"Secondary amine" is taken to mean, in particular, a compound $R_1R_2NH$, wherein $R_1$, $R_2$ independently of one another are selected from the group alkyl, long-chain alkyl, alkenyl, alkenyl-O—X, wherein X is selected from the group containing hydrogen and alkyl, alkoxy, long-chain alkoxy, cycloalkyl, aryl, arylene, haloalkyl, alkylpiperidyl, Wherein, in suitable moieties, one or more nonadjacent $CH_2$ groups, independently of one another, can be replaced by —O—, —S—, —NH—, —NR°—, —SiR°R°°—, —CO—, —COO—, —OCO—, —OCO—O—, —SO_2—, —S—CO—, —CO—S—, —CY$^1$=CY$^2$ or —C≡C— and more precisely such that O and/or S atoms are not directly bonded to one another, likewise optionally replaced with aryl or heteroaryl containing 1 to 30 carbon atoms (terminal $CH_3$ groups are taken to mean $CH_2$ groups in the sense of $CH_2$—H).

"Tertiary amine" is taken to mean, in particular, a compound $R_1R_2R_3N$, wherein $R_1$, $R_2$ and $R_3$ independently of one another are selected from the group alkyl, long-chain alkyl, alkenyl, alkenyl-O—X, wherein X is selected from the group containing hydrogen and alkyl, alkoxy, long-chain alkoxy, cycloalkyl, aryl, arylene, haloalkyl, alkylpiperidyl, wherein, in suitable moieties, one or more nonadjacent $CH_2$ groups, independently of one another, can be replaced by —O—, —S—, —NH—, —NR°—, —SiR°R°°—, —CO—, —COO—, —OCO—, —OCO—O—, —SO_2—, —S—CO—, —CO—S—, —CY$^1$=CY$^2$ or —C≡C— and more precisely such that O and/or S atoms are not directly bonded to one another, likewise optionally replaced by aryl or heteroaryl preferably containing 1 to 30 carbon atoms (terminal $CH_3$ groups are taken to mean $CH_2$ groups in the sense of $CH_2$—H).

According to a preferred embodiment of the invention, the at least one $CO_2$-absorbing agent has a boiling point of $\geq 100°$ C.

In the event that the at least one $CO_2$-absorbing agent is a mixture of components, it is understood here in particular that each of the components and/or the mixture of components has a boiling point of $\geq 100°$ C.; preferably, not only each of the components but also the mixture of the components has a boiling point of $\geq 100°$ C.

Such a boiling point ensures good phase separation for a multiplicity of applications within the present invention. Preferably, the at least one $CO_2$-absorbing agent has a boiling point of $\geq 110°$ C., more preferably $\geq 120°$ C.

According to a preferred embodiment of the invention, the at least one $CO_2$-absorbing agent has a $pK_a$ of $\geq 7.5$ and $\leq 11$.

In the event that the at least one $CO_2$-absorbing agent is a mixture of components, it is understood here in particular that each of the components and/or the mixture of the components has a $pK_a$ of $\geq 7.5$ and $\leq 11$; preferably, both each of the components and also the mixture of the components has a $pK_a$ of $\geq 7.5$ and $\leq 11$.

It has proved that these components, within a broad span of applications, are particularly highly suitable for use in the process according to the invention; frequently, in particular, the yield in step a)—binding of the $CO_2$ to the $CO_2$-absorbing agent—is particularly high.

According to a preferred embodiment of the invention, the at least one $CO_2$-absorbing agent has a $pK_a$ of $\geq 8$ and $\leq 10.5$, more preferably $\geq 9$ and $\leq 10$.

According to a preferred embodiment of the invention, the at least one $CO_2$-absorbing agent has a density of $\geq 0.7$ and $\leq 1.1$ g/ml at $25°$ C.

In the event that the at least one $CO_2$-absorbing agent is a mixture of components, it is understood here in particular that each of the components and/or the mixture of the components has a density of $\geq 0.7$ and $\leq 1.1$ g/ml at $25°$ C.; preferably, not only each of the components but also the mixture of the components has a density of $\geq 0.7$ and $\leq 1.1$ at $25°$ C.

Such a density setting has likewise proved to be beneficial for phase separation in many applications within the present invention.

According to a preferred embodiment of the invention, the at least one $CO_2$-absorbing agent has, at the absorption temperature (=the temperature at which step a) is carried out, a solubility in water of $\geq 0.1$ M and $\leq 5$ M.

In the event that the at least one $CO_2$-absorbing agent is a mixture of components, it is understood here, in particular, that each of the components and/or the mixture of the components has a solubility in water of $\geq 0.1$ M and $\leq 5$ M at the absorption temperature; preferably, not only each of the components but also the mixture of the components has a solubility in water of $\geq 0.1$ M and $\leq 5$ M at the absorption temperature.

Components having such solubility properties have likewise proved to be useful in many applications in practice, since then in step a), a highly concentrated aqueous solution of the $CO_2$-absorbing agent can also be used.

According to a further preferred embodiment of the invention, the at least one $CO_2$-absorbing agent has a solubility in water of $\geq 0.2$ M and $\leq 4.5$ M, more preferably $\geq 0.1$ M and $\leq 4$ M at the absorption temperature.

According to a preferred embodiment of the invention, the at least one $CO_2$-absorbing agent has a solubility in water of $\geq 0.001$ M and $\leq 0.3$ M at the regeneration temperature (=the temperature which is set for inducing the phase separation).

In the event that the at least one $CO_2$-absorbing agent is a mixture of components, it is understood here, in particular, that each of the components and/or the mixture of the components has a solubility in water of $\geq 0.001$ M and $\leq 0.3$ M at the regeneration temperature; preferably, not only each of the components but also the mixture of the components has a solubility in water of $\geq 0.001$ M and $\leq 0.3$ M at 60° C.

Components having such solubility properties have likewise proved to be useful in practice in many applications, since then in step b), virtually no $CO_2$-absorbing agent is transferred to the aqueous phase or remains there.

According to a further preferred embodiment of the invention, the at least one $CO_2$-absorbing agent has a solubility in water of $\geq 0.01$ M and $\leq 0.1$ M at the regeneration temperature.

According to a preferred embodiment of the invention, the at least one $CO_2$-absorbing agent comprises at least one secondary amine and/or at least one tertiary amine. Such component mixtures have proved to be useful in many applications in as much that secondary amines frequently have a rapid—but reversible—kinetics of binding to the $CO_2$, whereas although tertiary amines frequently react less quickly with $CO_2$, the binding (which usually proceeds ionically via hydrogen-carbonates of the approximate structure $R_3NH^+HCO_3^-$) is then usually so slightly reversible that frequently no backreaction proceeds under the conditions of step a).

According to a preferred embodiment of the invention, the ratio of the at least one secondary amine to the at least one tertiary amine is $\geq 1:0.5$ and $\leq 1:30$. This has proved to be practicable for many applications.

According to a preferred embodiment of the invention, the ratio of the at least one secondary amine to the at least one tertiary amine is $\geq 1:1$ and $\leq 1:20$, more preferably $\geq 1:2$ and $\leq 1:10$.

According to a preferred embodiment of the invention, the at least one $CO_2$-absorbing agent comprises at least one secondary amine having an absorption rate of $\geq 10^{-6}$ and $\leq 10^{-4}$ kmol m$^{-2}$ s$^{-1}$. This has proved practicable for many applications.

According to a preferred embodiment of the invention, the at least one $CO_2$-absorbing agent comprises at least one secondary amine having an absorption rate of $\geq 5 \times 10^{-5}$ and $\leq 10^{-4}$ kmol m$^{-2}$ s$^{-1}$, more preferably $\geq 10^{-5}$ and $\leq 10^{-4}$ kmol m$^{-2}$ s$^{-1}$.

According to a preferred embodiment of the invention, the at least one $CO_2$-absorbing agent comprises at least one tertiary amine having an absorption rate of $\geq 10^{-7}$ and $\leq 10^{-5}$ kmol m$^{-2}$ s$^{-1}$ at absorption temperature. This has proved practicable for many applications.

According to a preferred embodiment of the invention, the at least one $CO_2$-absorbing agent comprises at least one tertiary amine having an absorption rate of $\geq 5 \times 10^{-6}$ and $\leq 10^{-5}$ kmol m$^{-2}$ s$^{-1}$ at absorption temperature, more preferably $\geq 10^{-6}$ and $\leq 10^{-5}$ kmol m$^{-2}$ s$^{-1}$.

According to a preferred embodiment of the invention, the at least one $CO_2$-absorbing agent comprises at least one primary amine selected from the group containing pentylamine, hexylamine, heptylamine, octylamine, cyclohexylamine, 2-methylcyclohexylamine, 2-methyl-butylamine, 2-aminopentane, 2-aminoheptane, 2-amino-hexane, 2-aminooctane, 2-aminononane, 3-methoxypropyl-amine, 2-methyl-1,5-diaminopentane, geranylamine, 2-ethyl-1-hexylamine, 6-methyl-2-heptylamine, cyclooctylamine, aniline, N-phenylethylenediamine, 2-phenylethylamine, N,N-dimethyl-4-cyclooctene-1-amines, and also mixtures thereof.

According to a preferred embodiment of the invention, the at least one $CO_2$-absorbing agent comprises at least one secondary amine selected from the group containing dipropylamine, N-ethylbutylamine, dibutylamine, diisopropylamine, dicyclohexylamine, bis(2-ethylhexyl)amine, bis(alpha-methylbenzyl)amine, bis(1,3-dimethylbutyl)amine, diallylamine, bis[(s)-1-phenylethyl]amine, di-sec-butylamine, 2,2,6,6-tetramethylpiperidine, N-methylcyclohexylamine, benzyl-tertbutylamine, bis(2-ethylhexyl)amine, 4-tert-butyl-cyclohexylamine and also mixtures thereof.

According to a preferred embodiment of the invention, the at least one $CO_2$-absorbing agent comprises at least one tertiary amine selected from the group containing triethylamines, 2-(diethylamino)ethanol, tripropyl-amine, tributylamine, N,N-dimethylcyclohexylamine, dimethyloctylamine, dimethyl-(1-methylheptyl)amine, dimethylallylamine, N-ethyldiisopropylamine, tris(2-ethylhexyl)amine, bis(2-cyclohexyloxyethyl)methylamines, bis (2-(2,4-diethyloctyloxy)ethyl)methylamines, (2-(2-dimethylaminoethoxy)ethyl)dimethylamines, N-isopropylethylenediamine, N-methylenediamine, N,N-dimethylethylenediamine, N,N-dibutyltrimethylenediamine, tris[2-(isopropylamino)ethyl]amine, tris[2-(methylamino)-ethyl]amine and also mixtures thereof.

According to a preferred embodiment of the invention, in step a), use is made of an aqueous solution of the at least one $CO_2$-absorbing agent having a concentration of $\geq 1$ M and $\leq 5$ M.

According to a preferred embodiment of the invention, the process additionally comprises the step d) of heating the aqueous phase in order to liberate the $CO_2$.

The present invention likewise relates to a device for carrying out the process according to the invention.

The abovementioned and also the claimed components which are to be used according to the invention and are described in the exemplary embodiments are not subject to any particular exceptional conditions in their size, shape, material selection and technical design, in such a manner that the selection criteria which are known in the field of application can be used without restriction.

Further details, features and advantages of the subject matter of the invention result from the subclaims and also from the following description of the associated drawing in which—by way of example—an exemplary embodiment of the process according to the invention is shown. In the drawings:

FIG. 1 shows a schematic diagram of a device for carrying out the process according to the invention according to a first embodiment of the invention.

FIG. 1 shows a schematic diagram of a device 1 for carrying out the process according to the invention according to a first embodiment of the invention. The device 1 has an absorber 10 in which the gas stream (indicated by the arrows) is brought into contact with the $CO_2$-absorbing agent (which in the specific embodiment is an aqueous solution of a secondary amine and a tertiary amine). Via a pump 20, the $CO_2$-absorbing agent is then brought into a first vessel 30 and by means of a heat exchanger 40 then heated in such a manner that in the vessel 50 a phase separation takes place (as indicated by "aq" and "org".). In order to further support or accelerate the phase separation, all devices known to those skilled in the art such as centrifuges, etc., can be present for this.

It is obvious to any of those skilled in the art that—depending on the $CO_2$-absorbing agents used and also other conditions—the phases in the vessel 50 can also be inverted, i.e. that the organic phase is situated at the top. The volumetric ratio is also to be understood as purely diagrammatic and will be considerably different depending on the application.

In the present embodiment, the temperature in the vessel 50 is approximately 70-80° C. This has the effect that the $CO_2$ escapes directly from the aqueous phase and therefore can readily be collected. However, in other applications according to the present invention further devices can be present in which, e.g., the aqueous phase is removed and the $CO_2$ expelled separately by heating and thus collected.

Via a further heat exchanger 60, the temperature is reduced again and the $CO_2$-absorbing agent and also the aqueous phase collect in the vessel 70, where again a homogeneous phase is present. This is connected via a pump 80 to the absorber 10 in such a manner that a continuous process can be operated.

The invention claimed is:

1. Process for removing $CO_2$ from a gas mixture or gas stream, comprising the steps
   a) contacting the gas mixture or the gas stream with at least one $CO_2$-absorbing agent which, if appropriate, can be present in aqueous solution or suspension, the at least one $CO_2$-absorbing agent comprising at least one primary amine, at least one secondary amine, and at least one tertiary amine, wherein said primary amine is selected from the group consisting of pentylamine, hexylamine, heptylamine, octylamine, cyclohexylamine, 2-methylcyclohexylamine, 2-methylbutylamine, 2-aminopentane, 2-aminoheptane, 2-aminohexane, 2-aminooctane, 2-aminononane, 3-methoxypropylamine, 2-methyl-1,5-diaminopentane, geranylamine, 2-ethyl-1-hexylamine, 6-methyl-2-heptylamine, cyclooctylamine, aniline, N-phenylethylenediamine, 2-phenylethylamine, N,N-dimethyl-4-cyclooctene-1-amines, and a mixture thereof;
   b) partially removing the at least one $CO_2$-absorbing agent and inducing a phase separation into an aqueous phase and also a nonaqueous phase, wherein the at least one $CO_2$-absorbing agent, after the phase separation, resides at least predominantly in the nonaqueous phase; and also
   c) predominantly transferring the $CO_2$ to the aqueous phase,
   wherein step c) can proceed in part or completely simultaneously with step b).

2. Process according to claim 1, wherein the phase separation in step b) is induced by changing the temperature.

3. Process according to claim 1, wherein the phase separation in step b) is induced by changing the temperature by $\geq 10°$ C.

4. Process according to claim 1, wherein the phase separation in step b) is induced at a temperature of $\geq 60°$ C. to $\leq 100°$ C.

5. Process according to claim 1, wherein the at least one $CO_2$-absorbing agent has a boiling point of $\geq 100°$ C.

6. Process according to claim 1, wherein the at least one $CO_2$-absorbing agent has a $pK_a$ of $\geq 7.5$ and $\leq 11$.

7. Process according to claim 1, wherein the at least one $CO_2$-absorbing agent has a density of $\geq 0.7$ and $\leq 1.1$ g/ml at 25° C.

8. Process according to claim 1, wherein the at least one $CO_2$-absorbing agent has, at an absorption temperature at which step a) is carried out, a solubility in water of $\geq 0.1$ mole per liter and $\leq 5$ mole per liter.

9. Process according to claim 1, wherein the at least one $CO_2$-absorbing agent has a solubility in water of $\geq 0.001$ mole per liter and $\leq 0.3$ mole per liter at a regeneration temperature set for inducing the phase separation.

10. Process according to claim 1, wherein the ratio of the at least one secondary amine to the at least one tertiary amine is $\geq 1:0.5$ and $\leq 1:30$.

11. Process according to claim 1, wherein the at least one $CO_2$-absorbing agent comprises at least one tertiary amine having an absorption rate of $\geq 10^{-7}$ and $\leq 10^{-5}$ kmol m$^{-2}$ s$^{-1}$ at absorption temperature.

12. Process according to claim 1, wherein the at least one $CO_2$-absorbing agent comprises at least one tertiary amine having an absorption rate of $\geq 5 \times 10^{-6}$ and $\leq 10^{-5}$ kmol m$^{-2}$ s$^{-1}$ at absorption temperature.

13. Process according to claim 1, wherein the at least one $CO_2$-absorbing agent comprises at least one secondary amine selected from the group containing dipropylamine, N-ethylbutylamine, dibutylamine, diisopropylamine, dicyclohexylamine, bis(2-ethylhexyl)amine, bis(alpha-methylbenzyl)amine, bis(1,3-dimethylbutyl)amine, diallylamine, bis[(s)-1-phenylethyl]amine, di-sec-butylamine, 2,2,6,6-tetramethylpiperidine, N-methylcyclohexylamine, benzyl-tert-butylamine, bis(2-ethylhexyl)amine, 4-tert-butylcyclohexylamine and also mixtures thereof.

14. Process according to claim 1, wherein the at least one $CO_2$-absorbing agent comprises at least one tertiary amine selected from the group containing triethylamines, 2-(diethylamino)ethanol, tripropylamine, tributylamine, N,N-dimethylcyclohexylamine, dimethyloctylamine, dimethyl-(1-methylheptyl)amine, dimethylallylamine, N-ethyldiisopropylamine, tris(2-ethylhexyl)amine, bis(2-cyclohexyloxyethyl)methylamines, bis(2-(2,4-diethyloctyloxy)ethyl)methylamines, (2-(2-dimethylaminoethoxy)ethyl)dimethylamines, N-isopropylethylenediamine, N-methylenediamine, N,N-dimethylethylenediamine, N,N-dibutyltrimethylenediamine, tris[2-(isopropylamino)ethyl]amine, tris[2-(methylamino)ethyl]amine and also mixtures thereof.

15. Process according to claim 1, wherein, in step a), use is made of an aqueous solution of the at least one $CO_2$-absorbing agent having a concentration of $\geq 1$ mole per liter and $\leq 5$ mole per liter.

16. Process according to claim 1, additionally comprising step d) of heating the aqueous phase in order to liberate the $CO_2$.

17. Device for carrying out a process according to claim 1.

18. Process according to claim 1, wherein the at least one $CO_2$-absorbing agent comprises at least one tertiary amine having an absorption rate of $\geq 10^{-6}$ and $\leq 10^{-5}$ kmol m$^{-2}$ s$^{-1}$ at absorption temperature.

* * * * *